United States Patent
Wang et al.

(10) Patent No.: US 10,924,255 B2
(45) Date of Patent: Feb. 16, 2021

(54) BASE STATION, USER EQUIPMENT AND WIRELESS TRANSMISSION METHOD OF NARROW BAND-INTERNET OF THINGS

(71) Applicant: Institute For Information Industry, Taipei (TW)

(72) Inventors: Hai-Han Wang, Taipei (TW); Yi-Ting Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 55 days.

(21) Appl. No.: 16/373,603

(22) Filed: Apr. 2, 2019

(65) Prior Publication Data
US 2019/0305921 A1 Oct. 3, 2019

Related U.S. Application Data

(60) Provisional application No. 62/651,735, filed on Apr. 3, 2018.

(51) Int. Cl.
*H04L 5/14* (2006.01)
*H04W 72/04* (2009.01)
*H04W 72/12* (2009.01)

(52) U.S. Cl.
CPC .......... *H04L 5/14* (2013.01); *H04W 72/0446* (2013.01); *H04W 72/1278* (2013.01)

(58) Field of Classification Search
CPC .. H04L 5/14; H04W 72/0446; H04W 72/1278
See application file for complete search history.

(56) References Cited

U.S. PATENT DOCUMENTS

| | | | |
|---|---|---|---|
| 2010/0027446 A1* | 2/2010 | Choi | H04L 5/0091 370/280 |
| 2016/0323852 A1* | 11/2016 | Golitschek Edler von Elbwart | H04L 1/1887 |
| 2018/0234229 A1* | 8/2018 | Somichetty | H04L 5/0044 |
| 2019/0132809 A1* | 5/2019 | Tsuboi | H04W 56/001 |
| 2020/0015261 A1* | 1/2020 | Takeda | H04W 72/0446 |

* cited by examiner

*Primary Examiner* — Kevin C. Harper
(74) *Attorney, Agent, or Firm* — Skaar Ulbrich Macari, P.A.

(57) ABSTRACT

A wireless transmission method for Narrow Band-Internet of Things (NB-IoT) includes: receiving, by a user equipment, a parameter of scheduling delay from a base station; calculating, by the user equipment, a target subframe, designated by the base station, in a sequence of Time-Division Duplex (TDD) subframes according to the parameter of scheduling delay and a reference subframe in the sequence of TDD subframes; and performing, by the user equipment, a wireless transmission with the base station in the target subframe; wherein the parameter of scheduling delay corresponds to the number of available subframes between the reference subframe and the target subframe in the sequence of TDD subframes, and categories of the available subframes are related to the direction of the wireless transmission.

18 Claims, 6 Drawing Sheets

BASE STATION, USER EQUIPMENT AND WIRELESS TRANSMISSION METHOD OF NARROW BAND-INTERNET OF THINGS

PRIORITY

This application claims the priority and benefit of U.S. Provisional Patent Application Ser. No. 62/651,735 filed with the U.S. Patent and Trademark Office on Apr. 3, 2018, and the entirety of which is incorporated herein by reference.

FIELD

The present disclosure relates to a base station, a user equipment and a wireless transmission method. More particularly, the present disclosure relates to a base station, a user equipment and a wireless transmission method for Narrow Band-Internet of Things (NB-IoT).

BACKGROUND

In NB-IoT systems, a period of time between control signals and the corresponding uplink/downlink data signals is required for the user equipment to have enough time to process the control information received from the base station, which is also referred to as a scheduling delay. To be more specific, the base station notifies the user equipment of a scheduling delay via downlink control information, and then the user equipment performs a wireless transmission in the appropriate subframe according to the scheduling delay designated by the received downlink control information.

Duplex may be divided into Frequency Division Duplex (FDD) and Time Division Duplex (TDD). Conventional NB-IoT systems has adapted FDD for scheduling wireless transmissions, and therefore the uplink resources and downlink resources are arranged in different frequency bands. In such systems, the uplink and downlink resources may be scheduled by the base station according to a scheduling table which records the scheduling delay time of indicating the user equipment, and thereby solve the problem of scheduling delay. More specifically, since there are no downlink resources in the frequency band allocated for uplink resources, the base station may perform the scheduling according to the scheduling table directly without considering the downlink resources, and vice versa.

Conventional NB-IoT systems do not adapt TDD for scheduling wireless transmissions. However, if conventional NB-IoT systems try to adapt TDD for scheduling wireless transmissions with the same way as those adapting FDD, a big problem of how to arrange the appropriate subframes for the uplink and downlink resources without collision will be inevitable since the uplink and downlink resources must be interleaved in different time periods on the same frequency band. In view of this, it is very important in the art to solve the problem of scheduling delay in an NB-IoT system adapting TDD.

SUMMARY

To solve at least the aforesaid problem, provided is a base station for NB-IoT. The base station may comprise a processor and a transceiver electrically connected with the processor. The processor may be configured to determine a parameter of scheduling delay. The transceiver may be configured to transmit the parameter of scheduling delay to a user equipment, so that the user equipment calculates a target subframe, designated by the base station, in a sequence of TDD subframes according to the parameter of scheduling delay and a reference subframe in the sequence of TDD subframes, and then performs a wireless transmission with the base station in the target subframe. The parameter of scheduling delay corresponds to the number of available subframes between the reference subframe and the target subframe in the sequence of TDD subframes, and categories of the available subframes are related to the direction of the wireless transmission.

To solve at least the aforesaid problem, also provided is a user equipment for NB-IoT. The user equipment may comprise a transceiver and a processor electrically connected with the transceiver. The transceiver may be configured to receive a parameter of scheduling delay from a base station. The processor may be configured to calculate a target subframe, designated by the base station, in a sequence of TDD subframes according to the parameter of scheduling delay and a reference subframe in the sequence of TDD subframes, so that the transceiver performs a wireless transmission with the base station in the target subframe. The parameter of scheduling delay corresponds to the number of available subframes between the reference subframe and the target subframe in the sequence of TDD subframes, and categories of the available subframes are related to the direction of the wireless transmission.

To solve at least the aforesaid problem, further provided is a wireless transmission method for NB-IoT. The wireless transmission method may comprise:

receiving, by a user equipment, a parameter of scheduling delay from a base station;

calculating, by the user equipment, a target subframe, designated by the base station, in a sequence of TDD subframes according to the parameter of scheduling delay and a reference subframe in the sequence of TDD subframes; and performing, by the user equipment, a wireless transmission with the base station in the target subframe;

wherein the parameter of scheduling delay corresponds to the number of available subframes between the reference subframe and the target subframe in the sequence of TDD subframes, and categories of the available subframes are related to the direction of the wireless transmission.

The base station, user equipment and wireless transmission method mentioned above use available subframes as the unit of scheduling delay, wherein the categories of the available subframes are related to the direction of the wireless transmission to be performed by the base station and the user equipment. In doing so, the base station can exclude those unavailable subframes from the sequence of TDD subframes in which the uplink and downlink subframes are interleaved, and thus determine the subframes suitable for the wireless transmission to be performed by the base station and the user equipment. Accordingly, the base station, user equipment and wireless transmission method mentioned above are able to solve the problem of scheduling delay faced by the NB-IoT systems adapting TDD, and to utilize the wireless resources efficiently.

The aforesaid content is not intended to limit the present invention, but merely describes the technical problems that can be solved by the present invention, the technical means that can be adopted, and the technical effects that can be achieved, so that people having ordinary skill in the art can basically understand the present invention. People having ordinary skill in the art can understand the various embodiments of the present invention according to the attached figures and the content recited in the following embodiments.

DETAILED DESCRIPTION

The exemplary embodiments described below are not intended to limit the present invention to any specific environment, applications, examples, embodiments, structures, processes or steps as described in these example embodiments. In the attached figures, elements not directly related to the present invention are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the number of each element described below may be one or more under implementable circumstances.

Figure 1:
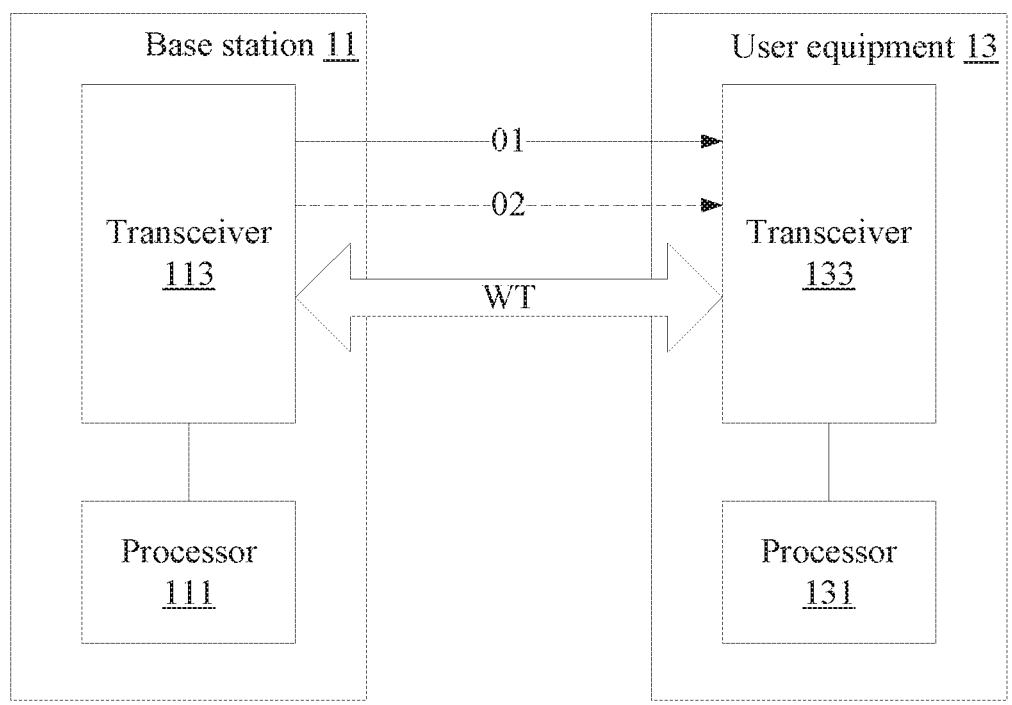
FIG. 1 illustrates a schematic view of a base station and a user equipment for an NB-IoT system according to one or more embodiments of the present invention.

FIG. 1 illustrates a schematic view of a base station and a user equipment for an NB-IoT system according to one or more embodiments of the present invention. The contents shown in FIG. 1 are merely for explaining the embodiments of the present invention instead of limiting the present invention.

Referring to FIG. 1, the NB-IoT system 1 adapts TDD for scheduling wireless transmissions, and the NB-IoT system 1 may comprise one or more base stations 11, one or more user equipment 13 and a core network (not shown). Each of the base stations 11 may comprise a processor 111 and a transceiver 113 electrically connected with the processor 111. The electrical connection between the processor 111 and the transceiver 113 may be direct connection (i.e., connection not via other elements) or indirect connection (i.e., connection via other elements). Depending on different requirements, the base stations 11 may be various types of base stations which are for example but not limited to: Macrocells, Microcells or Picocells or the like. Each of the user equipment 13 may comprise a processor 131 and a transceiver 133 electrically connected with the processor 131. The electrical connection between the processor 131 and the transceiver 133 may be direct connection (i.e., connection not via other elements) or indirect connection (i.e., connection via other elements). The user equipment 13 may be various electronic devices supporting NB-IoT.

Each of the processors 111 and the processors 131 may be a microprocessor or a microcontroller capable of signal processing. The microprocessor or microcontroller is a programmable specific integrated circuit which is capable of operating, storing, outputting/inputting or the like and may receive and process various encoded instructions, thereby performing various logic operations and arithmetic operations and outputting corresponding operational results. The processor 111 may be programmed to interpret various instructions so as to process data in the base station 11 and execute various operational procedures or programs. The processor 131 may be programmed to interpret various instructions so as to process data in the user equipment 13 and execute various operational procedures or programs.

Each of the transceivers 113 and the transceivers 133 may be constituted by a transmitter and a receiver, and may comprise for example but not limited to communication elements such as an antenna, an amplifier, a modulator, a demodulator, a detector, an analog-to-digital converter, a digital-to-analog converter or the like. The transceiver 113 may be configured to enable the base station 11 to communicate and exchange data with an external device. The transceiver 133 may be configured to enable the user equipment 13 to communicate and exchange data with an external device. For example, as shown in FIG. 1, the transceiver 113 of the base station 11 may perform a wireless transmission WT with the transceiver 133 of the user equipment 13. Depending on different requirements, the wireless transmission WT may be performed based on a narrowband downlink channel and/or a narrowband uplink channel.

Figure 2A:
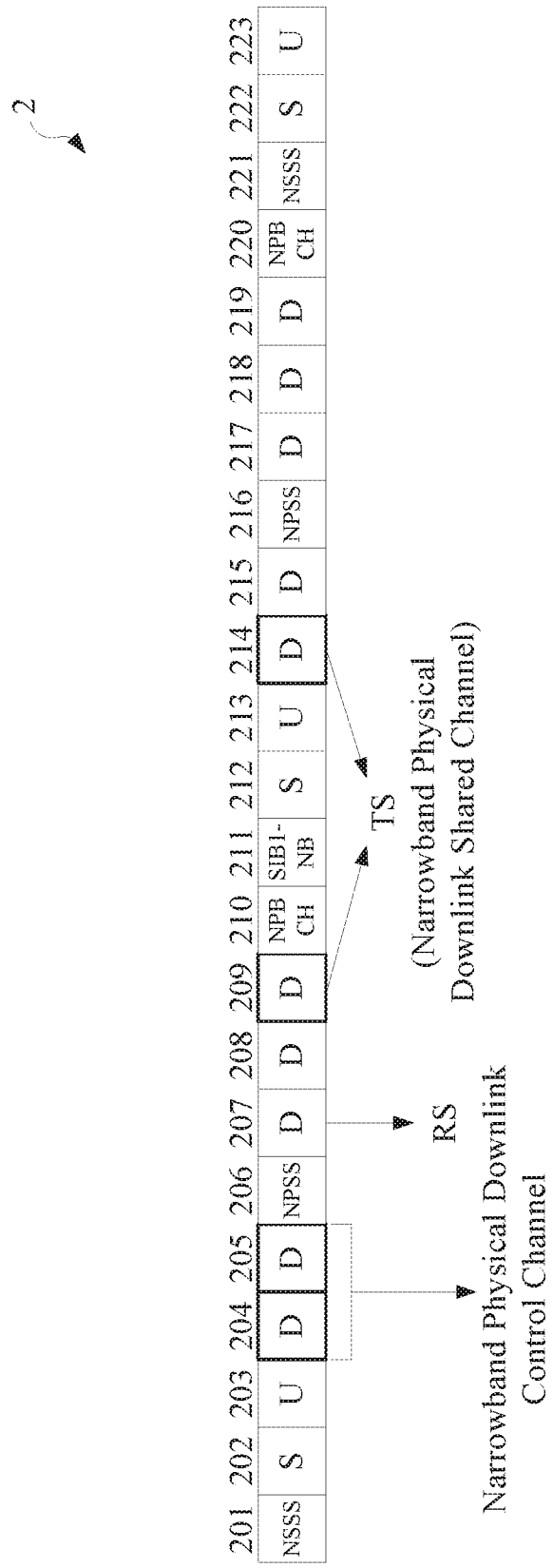
FIG. 2A illustrates a schematic view of a scheduling delay for a downlink wireless transmission according to one or more embodiments of the present invention.

FIG. 2A illustrates a schematic view of a scheduling delay for a downlink wireless transmission according to one or more embodiments of the present invention. The contents shown in FIG. 2A are merely for explaining the embodiments of the present invention instead of limiting the present invention.

Referring to FIG. 1 and FIG. 2A together, as an example, a downlink wireless transmission WT is performed by the NB-IOT system 1 based on the sequence 2 of TDD subframes which comprises a plurality of subframes 201~223 with a frame configuration as the $5^{th}$ type of frame configuration of Long-Term Evolution TDD (LTE-TDD). For ease of explanation, it is assumed that the categories of the subframes 201-223 in the sequence 2 of TDD subframes comprise uplink subframe U, downlink subframe D, special subframe S, subframe of narrowband downlink primary synchronization signal NPSS, subframe of narrowband downlink secondary synchronization signal NSSS and subframe of narrowband system information block type 1 SIB1-NB.

Furthermore, the processor 111 of the base station 11 may determine a parameter 01 of scheduling delay, and the transceiver 113 of the base station 11 may transmit the parameter 01 of scheduling delay to the transceiver 133 of the user equipment 13. Also, the processor 131 of the user equipment 13 may calculate a target subframe TS, designated by the base station 11, in the sequence 2 of TDD subframes according to the parameter 01 of scheduling delay and a reference subframe RS in the sequence 2 of TDD subframes, and the transceiver 133 of the user equipment 13 may then perform a downlink wireless transmission WT with the transceiver 113 of the base station 11 in the target subframe TS. The parameter 01 of scheduling delay corresponds to the number of available subframes between the reference subframe RS and the target subframe TS in the sequence 2 of TDD subframes, and the categories of the available subframes are related to the direction of the downlink wireless transmission WT (i.e., related to the downlink direction). Therefore, the category of available subframes comprises the downlink subframe D only.

In some embodiments, the categories of available subframes, besides the downlink subframe D, may further comprise the special subframe S. Whether the categories of available subframes comprise the special subframe S or not may be determined based on a specific number of repetitions of the downlink wireless transmission WT. Assuming that the category of available subframes does not comprise the special subframe S if the number of repetitions in the downlink wireless transmission WT is "2", and thus only the downlink subframes D are considered as the available subframes in FIG. 2A. That is, the category of available subframes comprises the downlink subframe D only.

In some embodiments, besides the specific number of repetitions of the downlink wireless transmission WT, whether the categories of available subframes comprise the special subframe S or not may also be determined based on the number of downlink symbols comprised in each of the special subframes S.

In some embodiments, the parameter 01 of scheduling delay may be included in the downlink control information (DCI) transmitted in the narrowband physical downlink control channel (NPDCCH). For example, as shown in FIG. 2A, the subframes 204 and 205 are used to build the NPDCCH, and the base station 11 may transmit the downlink control information which includes the parameter 01 of scheduling delay to the user equipment 13 via the NPDCCH.

In some embodiments, if the user equipment 13 relies on the base station 11 to designate the location of the reference subframe RS (i.e., the location of the reference subframe RS is not default), the processor 111 of the base station 11 may further determine a location parameter 02 for the location of the reference subframe RS, and the parameter 01 of scheduling delay and the location parameter 02 may be included in the downlink control information. The location parameter 02 may be used to notify the user equipment 13 of the location of the reference subframe RS in the sequence 2 of TDD subframes. For example, the location parameter 02 may be represented as the X-th subframe after the downlink subframes D configured for transmitting downlink control information, wherein "X" is a positive integer such as "4", "8", "12", etc. Location parameters 02 determined by the processor 111 of the base station 11 for a plurality of user equipment 13 may be the same as each other, or otherwise different with each other. In some other embodiments, the location parameter 02 may be included in the radio resource control (RRC) signals in advance, and the parameter 01 of scheduling delay may be included in the downlink control information.

In some embodiments, if the user equipment 13 does not rely on the base station 11 to designate the location of the reference subframe RS (i.e., the location of the reference subframe RS is default), the base station 11 may not determine and transmit the location parameter 02 to the user equipment 13. For example, the location of the reference subframe RS in the sequence 2 of TDD subframes may be a consensus between the base station 11 and the user equipment 13 such as the X-th subframe after the downlink subframes D configured for transmitting downlink control information by default, wherein "X" is an positive integer such as "4", "8", "12", etc.

In some embodiments, the processor 111 of the base station 11 may first determine the target subframe TS according to the schedulable resources in the NB-IoT system 1, and then determine the parameter 01 of scheduling delay according to the reference subframe RS and the target subframe TS. For example, as shown in FIG. 2A, if the subframe 207 is the reference subframe RS in the sequence 2 of TDD subframes (i.e., the second subframe after the last subframe 205 in which the previous wireless transmission is performed for the downlink control information based on the NPDCH), the subframes 209 and 214 are both the target subframes TS, and the value of the parameter 01 of scheduling delay is "2". The parameter 01 of scheduling delay with a value of "2" indicates that the number of available subframes that can be used for downlink wireless transmission WT between the first target subframe TS (i.e., the subframe 209) and the reference subframe RS is two, and to put it in other words, the next available subframe of two available subframes (i.e., the subframes 207 and 208) counted from the reference subframe RS is the first target subframe TS. Since the number of repetitions of the downlink wireless transmission WT is "2", the second target subframe TS is scheduled to the next available subframe 214 after the available subframe 209.

Correspondingly, the user equipment 13 may calculate the target subframe TS, designated by the base station 11, in the sequence 2 of TDD subframes according to the parameter 01 of scheduling delay and the reference subframe RS in the sequence 2 of TDD subframes, and then perform the downlink wireless transmission WT with the base station 11 in the target subframe TS. For example, as shown in FIG. 2A, the subframes 209 and 214 are used to build a narrowband physical downlink shared channel (NPDSCH), and the base station 11 performs the downlink wireless transmission WT with the user equipment 13 via the NPDSCHs.

In some embodiments, the value of the parameter 01 of scheduling delay may be set to "0"; that is, the first target subframe TS is also the reference subframe RS. In other words, the value of the parameter 01 of scheduling delay may be set to "0" when the location of the reference subframe RS in the sequence 2 of TDD subframes is an available subframe (i.e., the downlink subframe D), and reference subframe RS and the first target subframe TS refer to the same available subframe under such circumstances.

In some embodiments, the subframes 207 and 208 may also be used to build a narrowband physical downlink control channel, and the base station 11 may transmit another downlink control information to another user equipment (not shown) via the narrowband physical downlink control channel, wherein another parameter of scheduling delay may be included in the another downlink control information. The another parameter of scheduling delay may be the same as, or be different with, the parameter 01 of scheduling delay. Moreover, in some other embodiments, a location parameter for a location of another reference subframe necessary for the another user equipment may be included in the another downlink control information, so as to notify the another user equipment of the location of the another reference subframe in the sequence 2 of TDD subframes. The location parameter of the another reference subframe may be the same as, or be different with, the location parameter 02.

Figure 2B:
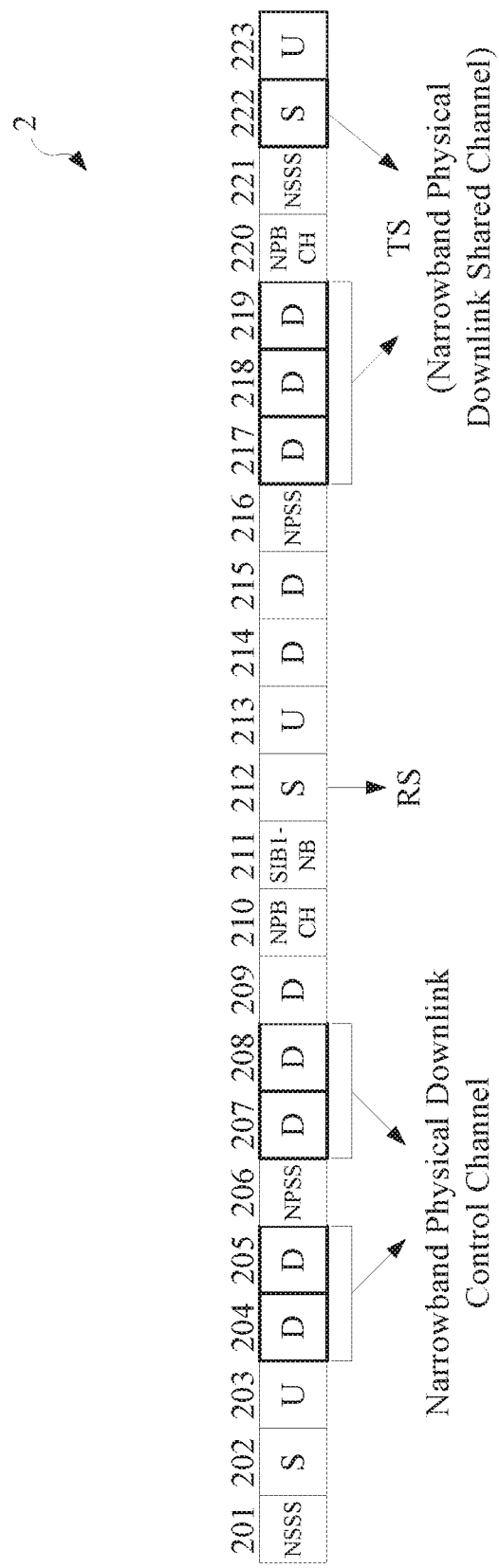
FIG. 2B illustrates a schematic view of another scheduling delay for a downlink wireless transmission according to one or more embodiments of the present invention.

FIG. 2B illustrates a schematic view of another scheduling delay for a downlink wireless transmission according to one or more embodiments of the present invention. The contents shown in FIG. 2B are merely for explaining the embodiments of the present invention instead of limiting the present invention. Unless stated otherwise, the above descriptions with respect to FIG. 2A may be considered directly or correspondingly as also for the description of FIG. 2B, without contradiction.

In FIG. 2B, a downlink wireless transmission WT is also performed by the NB-IOT system 1 based on the sequence 2 of TDD subframes, but the number of repetitions of the wireless downlink wireless transmission WT now is "4". Also, it is assumed that the categories of available subframes comprise the special subframe S when the number of repetitions of the wireless downlink wireless transmission WT is "4", and thus the downlink subframes D and the special subframe S in FIG. 2B may be considered the available subframes. That is, the categories of the available subframes comprise the downlink subframes D and the special subframe S.

As shown in FIG. 2B, if the subframes 204, 205, 207 and 208 are used to build a narrowband physical downlink control channel, the base station 11 may transmit downlink control information that includes a parameter 01 of scheduling delay to the user equipment 13 via the narrowband physical downlink control channel. Moreover, in some embodiments, the base station 11 may further determine a location parameter 02 for a location of the reference subframe RS necessary for the user equipment 13 and the parameter 01 of scheduling delay and the location parameter 02 may be included in the downlink control information.

As shown in FIG. 2B, if the location of the reference subframe RS in the sequence 2 of TDD subframes is the subframe 212 (i.e., the $4^{th}$ subframe after the last subframe 208 in which the previous wireless transmission is performed for the downlink control information based on the NPDCH), the subframes 217, 218, 219 and 222 are the target subframes TS, and the value of the parameter 01 of scheduling delay is "3". The parameter 01 of scheduling delay with a value of "3" indicates that the number of available subframes that can be used for downlink wireless transmission WT between the first target subframe TS (i.e., the subframe 217) and the reference subframe RS is three, and in other words, the next available subframe of three available subframes (i.e., the subframes 212, 214 and 215) counted from the reference subframe RS is the first target subframe TS. Since the number of repetitions of the downlink wireless transmission WT is "4", the second, third and fourth target subframes TS are scheduled to the available subframes 218, 219 and 222 respectively.

As shown in FIG. 2B, the subframes 217, 218, 219 and 222 are used to build a narrowband physical downlink shared channel, and the base station 11 performs the downlink wireless transmission WT with the user equipment 13 via the narrowband physical downlink shared channel.

Note that, in FIGS. 2A and 2B, the number of repetitions of the downlink control information being the same as the number of repetitions of the corresponding downlink wireless transmission WT is merely for ease of description, and the people having ordinary skill in the art shall be able to realize that the number of repetitions of the downlink control information may be different with the number of repetitions of the corresponding downlink wireless transmission WT.

Figure 3A:
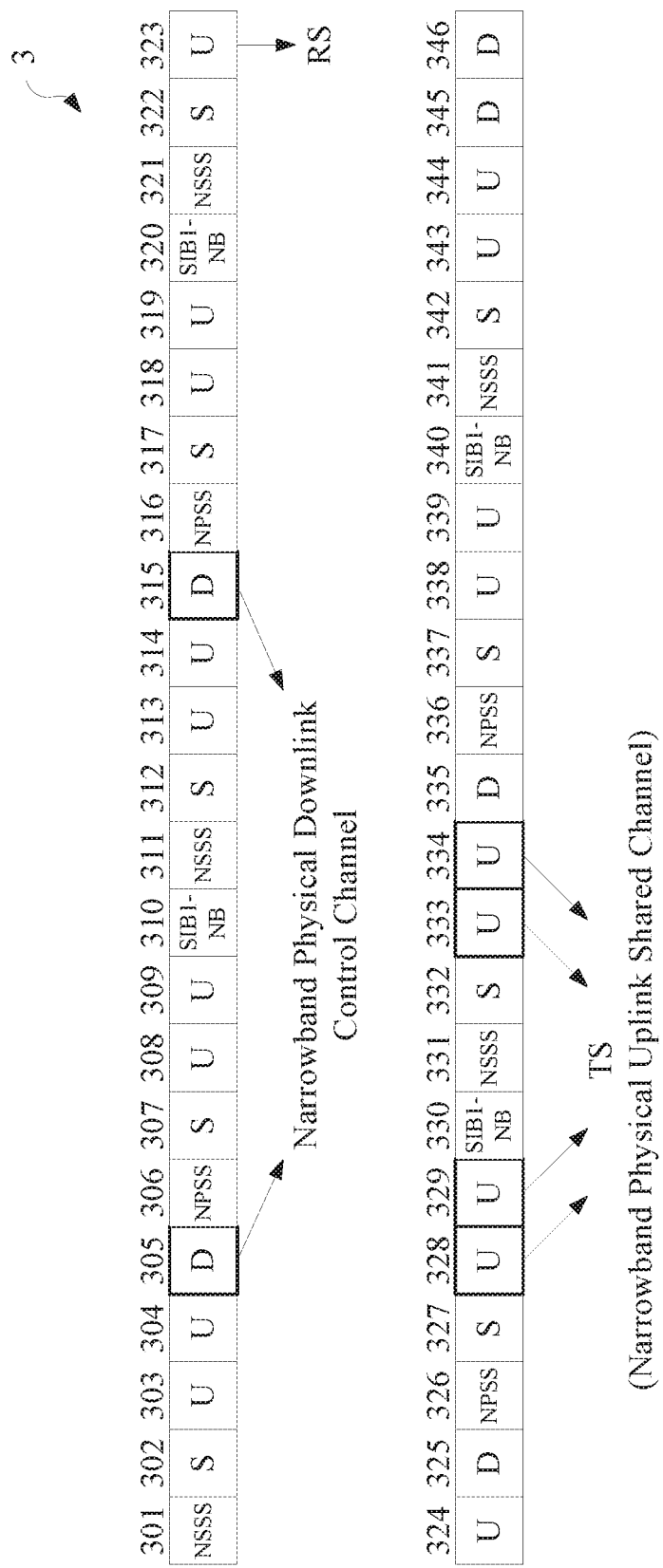
FIG. 3A illustrates schematic views of a scheduling delay for an uplink wireless transmission according to one or more embodiments of the present invention.

FIG. 3A illustrates schematic views of a scheduling delay for an uplink wireless transmission according to one or more embodiments of the present invention. The contents shown in FIG. 3A are merely for explaining the embodiments of the present invention instead of limiting the present invention. Unless stated otherwise, the above descriptions with respect to FIGS. 2A and 2B may be considered directly or correspondingly as also for the description of FIG. 3A, without contradiction.

Referring to FIG. 1 and FIG. 3A together, as an example, an uplink wireless transmission WT is performed by the NB-IOT system 1 based on a sequence 3 of TDD subframes which comprises a plurality of subframes 301-346 with a frame configuration as the first type of frame configuration of LTE-TDD. In addition, the number of repetitions of the uplink wireless transmission WT is "4". For ease of explanation, it is assumed that the categories of the subframes 301-223 in the sequence 3 of TDD subframes comprise uplink subframe U, downlink subframe D, special subframe S, subframe of narrowband downlink primary synchronization signal NPSS, subframe of narrowband downlink secondary synchronization signal NSSS and subframe of narrowband system information block type 1 SIB1-NB. Moreover, it is assumed that the category of available subframes does not comprise the special subframe S if the number of repetitions in the downlink wireless transmission WT is "4", and thus only the uplink subframes U are considered as the available subframes in FIG. 3A. That is, the category of available subframes comprises the uplink subframe U only.

In some embodiments, whether the categories of available subframes comprise the special subframe S or not may be determined based on the number of uplink symbols comprised in each of the special subframes S.

As shown in FIG. 3A, the subframes 305 and 315 are used to build the narrowband physical downlink control channel, and the base station 11 may transmit the downlink control information that includes the parameter 01 of scheduling delay to the user equipment 13 via the narrowband physical downlink control channel. Moreover, in some embodiments, the base station 11 may further determine a location parameter 02 for a location of the reference subframe RS necessary for the user equipment 13, and the location parameter 02 is also included in the downlink control information.

As shown in FIG. 3A, if the location of the reference subframe RS in the sequence 3 of TDD subframes is the subframe 323 (i.e., the $8^{th}$ subframe after the last subframe 315 in which the previous wireless transmission is performed for the downlink control information based on the NPDCH), the subframes 328, 329 333 and 334 are the target subframes TS, and the value of the parameter 01 of scheduling delay is "2".

Note that, in some embodiments, the value of the parameter 01 of scheduling delay may be set to "0", that is, the first target subframe TS is also the reference subframe. In other words, the value of the parameter 01 of scheduling delay may be set to "0" when the location of the reference subframe RS in the sequence 3 of TDD subframes is an available subframe (i.e., the uplink subframe U), and the reference subframe RS and the first target subframe TS refer to the same available subframe under such circumstances.

As shown in FIG. 3A, the subframes 328, 329, 333 and 334 are used to build a narrowband physical uplink shared channel, and the base station 11 performs the uplink wireless transmission WT with the user equipment 13 via the narrowband physical uplink shared channel.

Figure 3B:
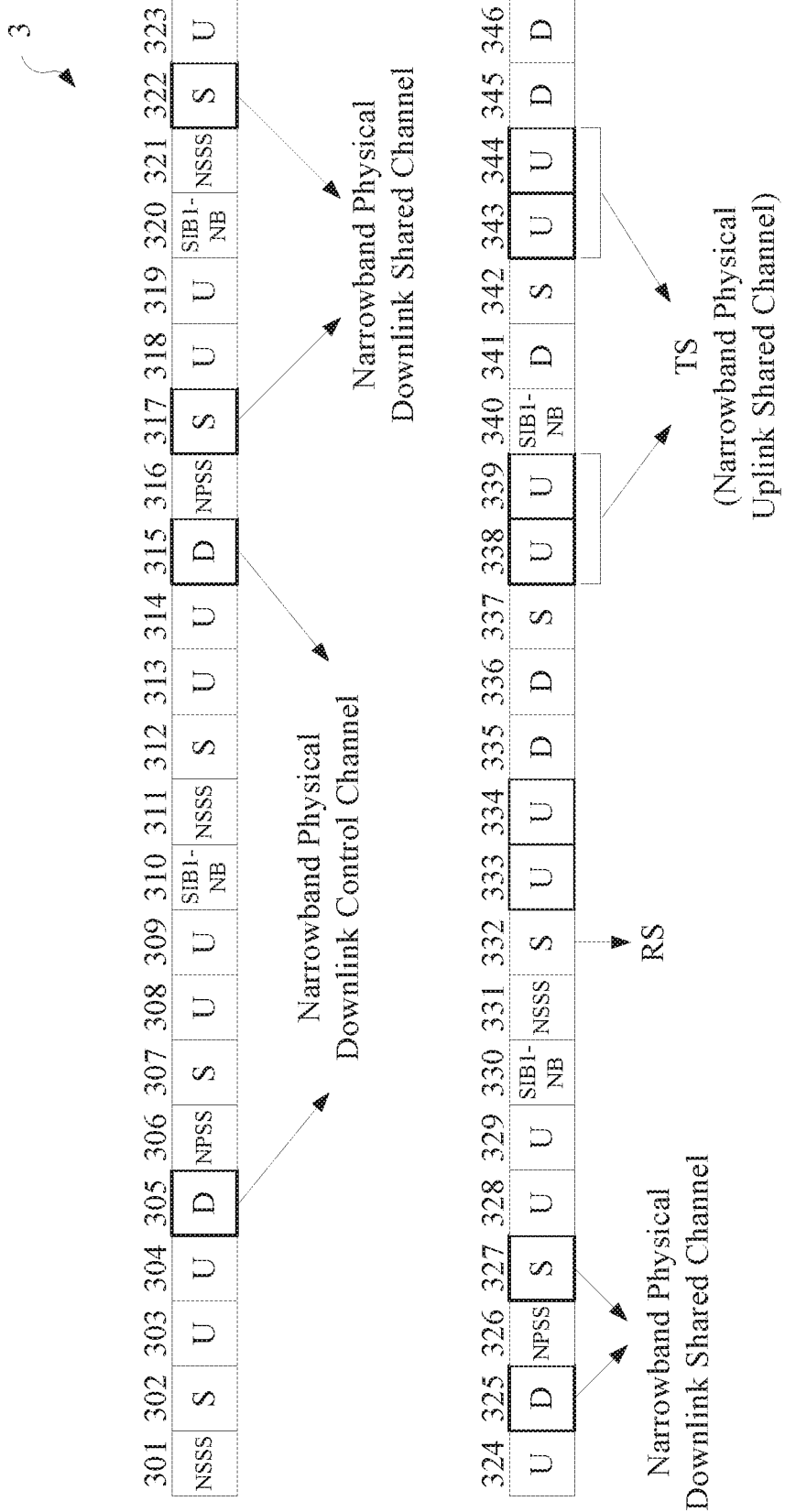
FIG. 3B illustrates schematic views of another scheduling delay for an uplink wireless transmission according to one or more embodiments of the present invention.

FIG. 3B illustrates schematic views of another scheduling delay for an uplink wireless transmission according to one or more embodiments of the present invention. The contents shown in FIG. 3B are merely for explaining the embodiments of the present invention instead of limiting the present invention. Unless stated otherwise, the above descriptions with respect to FIGS. 2A, 2B and 3A may be considered directly or correspondingly as also for the description of FIG. 3B, without contradiction.

In FIG. 3B, a downlink wireless transmission WT and an uplink wireless transmission WT are performed by the NB-IOT system 1 based on the same sequence 3 of TDD subframes, and the numbers of repetitions of the downlink wireless transmission WT and the uplink wireless transmission WT are both "4". Furthermore, in FIG. 3B, only the uplink subframes U are considered the available subframes regarding the uplink wireless transmission WT, and that is, the category of available subframe merely comprise the uplink subframe U.

As shown in FIG. 3B, the subframes 305 and 315 are used to build a narrowband physical downlink control channel, and the base station 11 may transmit downlink control information that includes a parameter 01 of scheduling delay to the user equipment 13 via the narrowband physical downlink control channel. Moreover, in some embodiments, the base station 11 may further determine a location parameter 02 for a location of the reference subframe RS necessary for the user equipment 13, and the location parameter 02 of the reference subframe is also included in the downlink control information.

As shown in FIG. 3B, the subframes 317, 322, 325 and 327 are used to build a narrowband physical downlink shared channel, and the base station 11 performs the downlink wireless transmission WT with the user equipment 13 via the narrowband physical downlink shared channel.

As shown in FIG. 3B, if the location of the reference subframe RS in the sequence 3 of TDD subframes is the subframe 332 (i.e., the $5^{th}$ subframe after the last subframe 327 in which the previous wireless transmission is performed for the downlink data based on the NPDSH), the subframes 338, 339, 343 and 344 are the target subframes TS, and the value of the parameter 01 of scheduling delay is "2". The parameter 01 of scheduling delay with a value of "2" indicates that the number of available subframes that can be used for downlink wireless transmission WT between the first target subframe TS (i.e., the subframe 338) and the reference subframe RS is two, and in other words, the next available subframe of two available subframes (i.e., the subframes 333 and 334) counted from the reference subframe RS is the first target subframe TS. Since the number of repetitions of the uplink wireless transmission WT is "4", the second, third and fourth target subframes TS are scheduled to the available subframes 339, 343 and 344 respectively.

As shown in FIG. 3B, the subframes 338, 339, 343 and 344 are used to build a narrowband physical uplink shared channel, and the base station 11 performs the uplink wireless transmission WT via the narrowband physical uplink shared channel. For example, the user equipment 13 may transmit a Hybrid-Automatic-Resend-Request ACK (HARQ ACK) signal or a HARQ NACK signal to the base station 11 in subframes 338, 339, 343 and 344, in order to respond to the downlink data transmitted by the base station 11 in subframes 317, 322, 325 and 327.

Figure 4:
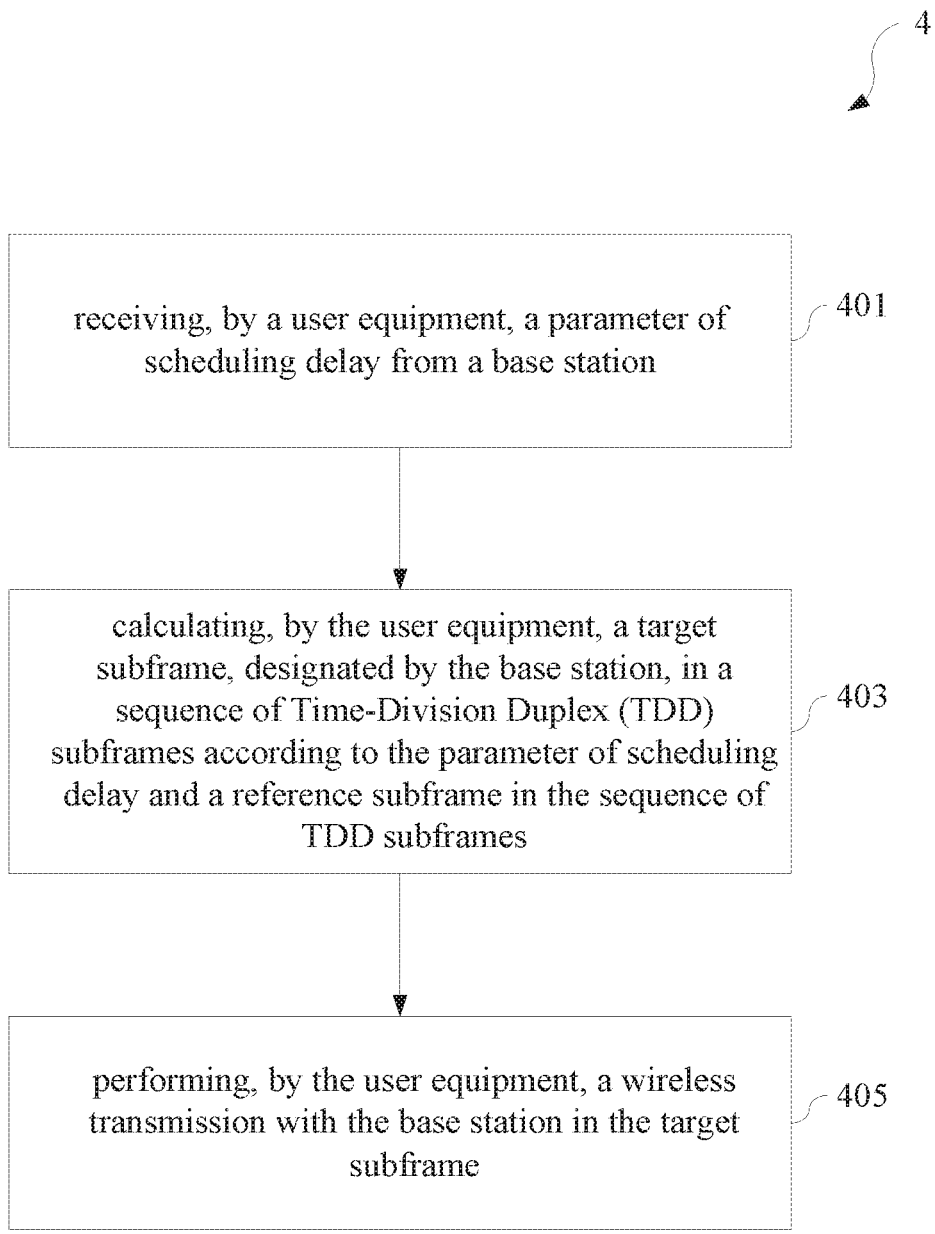
FIG. 4 illustrates a schematic view of a wireless transmission method for NB-IoT according to one or more embodiments of the present invention.

FIG. 4 illustrates a schematic view of a wireless transmission method for NB-IoT according to one or more embodiments of the present invention. The contents shown in FIG. 4 are merely for explaining the embodiments of the present invention instead of limiting the present invention.

Referring to FIG. 4, a wireless transmission method 4 for Narrow Band-Internet of Things (NB-IoT) may comprise the following steps:

receiving, by a user equipment, a parameter of scheduling delay from a base station (marked as step 401);

calculating, by the user equipment, a target subframe, designated by the base station, in a sequence of Time-Division Duplex (TDD) subframes according to the parameter of scheduling delay and a reference subframe in the sequence of TDD subframes (marked as step 403); and performing, by the user equipment, a wireless transmission with the base station in the target subframe (marked as step 405);

wherein the parameter of scheduling delay corresponds to the number of available subframes between the reference subframe and the target subframe in the sequence of TDD subframes, and categories of the available subframes are related to the direction of the wireless transmission.

In some embodiments, regarding the wireless transmission method 4, the user equipment receives the parameter of scheduling delay from downlink control information transmitted by the base station in a narrowband downlink control channel.

In some embodiments, in addition to steps 401-405, the wireless transmission method 4 may further comprises the step of receiving, by the user equipment, a location parameter determined from the base station which determines the location parameter for a location of the reference subframe. Also, the parameter of scheduling delay and the location parameter is received from downlink control information transmitted by the base station in a narrowband downlink control channel.

In some embodiments, regarding the wireless transmission method 4, the wireless transmission is performed based on a narrowband uplink channel, and the categories of the available subframes comprise uplink subframes.

In some embodiments, regarding the wireless transmission method 4, the wireless transmission is performed based on a narrowband downlink channel, and the categories of the available subframes comprise downlink subframes and special subframes.

In some embodiments, regarding the wireless transmission method 4, the wireless transmission is performed based on a narrowband downlink channel, and the categories of the available subframes comprise downlink subframes and special subframes. Moreover, the categories of the available subframes comprising the special subframes is based on a specific number of repetitions.

In some embodiments, regarding the wireless transmission method 4, the location of the reference subframe in the sequence of TDD subframes is default.

In some embodiments, regarding the wireless transmission method 4, the location of the reference subframe in the sequence of TDD subframes is the X-th subframe after the last subframe in which a previous wireless transmission is performed based on a narrowband downlink control channel or a narrowband downlink shared channel.

In some embodiments, the wireless transmission method 4 may be implemented in the NB-IoT system 1. The way of implementing the wireless transmission method 4 in the NB-IoT system 1 can be directly understood by people having ordinary skill in the art based on the aforesaid descriptions for the NB-IoT system 1, and therefore will not be further described herein.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station for Narrow Band-Internet of Things (NB-IoT), comprising:
  a processor, configured to determine a location parameter for a location of a reference subframe in a sequence of Time-Division Duplex (TDD) subframes and a parameter of scheduling delay; and a transceiver electrically connected with the processor, configured to transmit downlink control information including the parameter of scheduling delay and the location parameter to a user equipment in a narrowband downlink control channel, so that the user equipment calculates a target subframe, designated by the base station, in the sequence of TDD subframes according to the parameter of scheduling delay and the reference subframe in the sequence of TDD subframes, and then performs a wireless transmission with the base station in the target subframe;

wherein the parameter of scheduling delay corresponds to the number of available subframes between the reference subframe and the target subframe in the sequence of TDD subframes, and categories of the available subframes are related to the direction of the wireless transmission.

2. The base station of claim 1, wherein the wireless transmission is performed based on a narrowband uplink channel, and the categories of the available subframes comprise uplink subframes.

3. The base station of claim 1, wherein the wireless transmission is performed based on a narrowband downlink channel, and the categories of the available subframes comprise downlink subframes and special subframes.

4. The base station of claim 3, wherein the categories of the available subframes comprising the special subframes is based on a specific number of repetitions.

5. The base station of claim 1, wherein the location of the reference subframe in the sequence of TDD subframes is default.

6. The base station of claim 1, wherein the location of the reference subframe in the sequence of TDD subframes is the X-th subframe after the last subframe in which a previous wireless transmission is performed based on a narrowband downlink control channel or a narrowband downlink shared channel.

7. A user equipment for Narrow Band-Internet of Things (NB-IoT), comprising:
a transceiver, configured to receive a parameter of scheduling delay and a location parameter from downlink control information transmitted by a base station in a narrowband downlink control channel, the base station determining the location parameter for a location of a reference subframe in a sequence of Time-Division Duplex (TDD) subframes; and
a processor electrically connected with the transceiver, configured to calculate a target subframe, designated by the base station, in the sequence of TDD subframes according to the parameter of scheduling delay and the reference subframe in the sequence of TDD subframes, so that the transceiver performs a wireless transmission with the base station in the target subframe;
wherein the parameter of scheduling delay corresponds to the number of available subframes between the reference subframe and the target subframe in the sequence of TDD subframes, and categories of the available subframes are related to the direction of the wireless transmission.

8. The user equipment of claim 7, wherein the wireless transmission is performed based on a narrowband uplink channel, and the categories of the available subframes comprise uplink subframes.

9. The user equipment of claim 7, wherein the wireless transmission is performed based on a narrowband downlink channel, and the categories of the available subframes comprise downlink subframes and special subframes.

10. The user equipment of claim 9, wherein the categories of the available subframes comprising the special subframes is based on a specific number of repetitions.

11. The user equipment of claim 7, wherein the location of the reference subframe in the sequence of TDD subframes is default.

12. The user equipment of claim 7, wherein the location of the reference subframe in the sequence of TDD subframes is the X-th subframe after the last subframe in which a previous wireless transmission is performed based on a narrowband downlink control channel or a narrowband downlink shared channel.

13. A wireless transmission method for Narrow Band-Internet of Things (NB-IoT), comprising:
receiving, by a user equipment, a parameter of scheduling delay and a location parameter from downlink control information transmitted by a base station in a narrowband downlink control channel, wherein the base station determines the location parameter for a location of a reference subframe in a sequence of Time-Division Duplex (TDD) subframes;
calculating, by the user equipment, a target subframe, designated by the base station, in the sequence of TDD subframes according to the parameter of scheduling delay and the reference subframe in the sequence of TDD subframes; and
performing, by the user equipment, a wireless transmission with the base station in the target subframe;
wherein the parameter of scheduling delay corresponds to the number of available subframes between the reference subframe and the target subframe in the sequence of TDD subframes, and categories of the available subframes are related to the direction of the wireless transmission.

14. The wireless transmission method of claim 13, wherein the wireless transmission is performed based on a narrowband uplink channel, and the categories of the available subframes comprise uplink subframes.

15. The wireless transmission method of claim 13, wherein the wireless transmission is performed based on a narrowband downlink channel, and the categories of the available subframes comprise downlink subframes and special subframes.

16. The wireless transmission method of claim 15, wherein the categories of the available subframes comprising the special subframes is based on a specific number of repetitions.

17. The wireless transmission method of claim 13, wherein the location of the reference subframe in the sequence of TDD subframes is default.

18. The wireless transmission method of claim 13, wherein the location of the reference subframe in the sequence of TDD subframes is the X-th subframe after the last subframe in which a previous wireless transmission is performed based on a narrowband downlink control channel or a narrowband downlink shared channel.

* * * * *